July 20, 1926.

H. S. HEINEMAN

UNIVERSALLY VISIBLE SIGNAL

Filed May 24, 1922  2 Sheets-Sheet 1

INVENTOR:
HERBERT S. HEINEMAN,
By
Graham+Linie
ATTORNEYS.

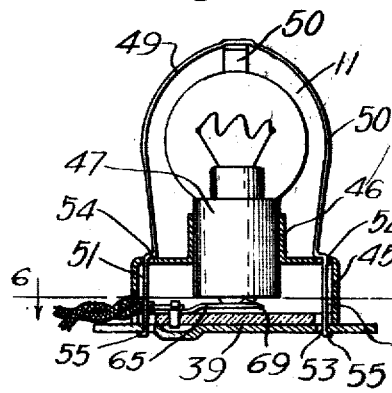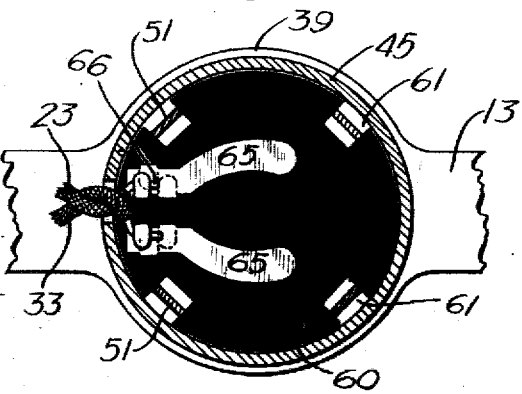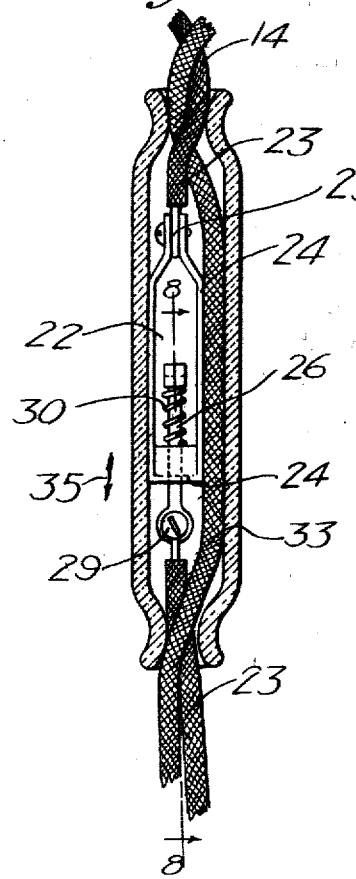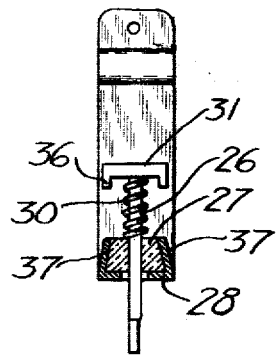

Patented July 20, 1926.

1,593,124

UNITED STATES PATENT OFFICE.

HERBERT S. HEINEMAN, OF LOS ANGELES, CALIFORNIA.

UNIVERSALLY VISIBLE SIGNAL.

Application filed May 24, 1922. Serial No. 563,240.

My invention relates to signaling devices for use by drivers of automobiles for the purpose of indicating to other drivers and pedestrians an intended change in direction of travel or diminution of speed.

It is the principal object of my invention to provide a signal which may be worn upon the driver's arm and which is provided with a light so that it may be seen at night.

It is a further object of the invention to provide a universally visible signal which may be seen from the front, rear and sides.

It is a further object of the invention to provide a signal light which will be illuminated only when the driver's arm is extended.

It is also an object of the invention to provide a means for attaching the electric cord, through which the light is energized, to the retaining band which supports the light in such a manner that a pull upon the cord will not exert a displacing force upon the retaining band.

It is a still further object of the invention to provide a novel form of tension actuated switch which is placed in the light cord and which is adapted to close the light feeding circuit when a pull is exerted upon the cord such as occurs when the driver's arm is extended.

The specific advantages of the invention and further objects thereof will be made evident hereinafter.

Referring to the drawings, which are for illustrative purposes only:—

Fig. 5 is an enlarged section taken substantially upon a plane represented by the line 5—5 of Fig. 4, for the purpose of illustrating the manner in which the lamp is mounted upon the arm clamp.

Fig. 6 is a section taken upon the horizontal plane represented by the line 6—6 of Fig. 5.

Fig. 7 is an enlarged detailed view showing the manner in which the tension actuated switch which I have devised is placed on one of the conductors forming the connecting cord of the signaling device.

Fig. 8 is a section through this switch taken upon the plane represented by the line 8—8 in Fig. 7.

A great many traffic accidents occur at night owing to the inability of the drivers of automobiles to determine the intended movements of preceding machines because of obstruction of the vision owing to the darkness, which prevents a clear view of the arm signals given by the drivers of preceding machines.

Figure 1:
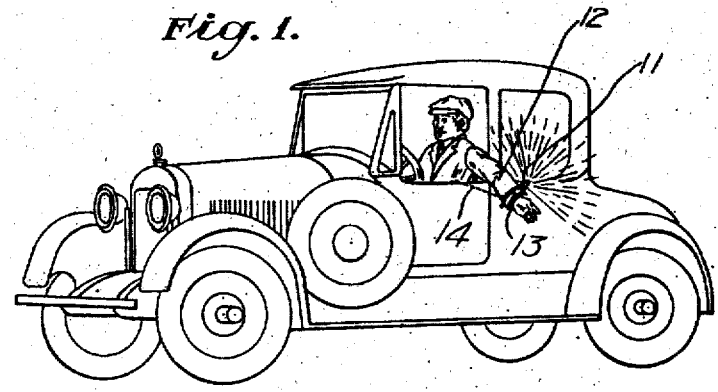
Fig. 1 is a view illustrating the utility of my invention.

My invention provides, as shown in Fig. 1, an electric lamp 11 adapted to be maintained upon the arm 12 which is used for the purpose of signaling the driver's intended movement. This lamp is supported upon an especially constructed clamp 13 and is illuminated by electric current supplied from the lighting system of the automobile by a cord 14. Switch means are provided in the cord 14 whereby the lamp 11 will be illuminated, as will be hereinafter fully described, only when the arm is extended for signaling purposes, as shown in Fig. 1.

Figure 2:
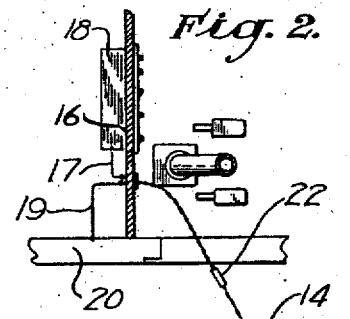
Fig. 2 is a diagrammatic plan view showing a preferable manner of connecting the signal to the electrical system of the automobile.

In the diagram, Fig. 2, the cord 14 is shown connected into the instrument board 16, one of the conductors 17 being connected to the switch box 18 and the other conductor 19 being grounded to the frame 20. A switch 22 is adapted to close the circuit with the lamp 11 when a pull is exerted upon the cord 14 which occurs when the arm is extended, this switch 22 being inserted in one of the conductors 23 of the cord 14, as shown in Fig. 7, and consisting of a clevis 24 to which the conductor 23 is attached at 25, and a square rod 26, having a T-head 31, which operates through an insulator 27 maintained in the lower end 28 of the clevis 24 and is adapted to be attached to the conductor 23, as indicated at 29.

A spring 30 is placed between the head 31 of the member 26 and the insulator 27, and holds the T rod normally in position shown in the figures. The conductor 23 is cut slightly shorter than the conductor 33 so that when a pull is exerted upon the cord 14, a tension will first be exerted in the conductor 23 causing the T rod to be pulled downwardly in the direction of the arrow 35, thus causing contact to be made between the downwardly turned tips 36 of the head 31 and the upwardly turned flanges 37 of the clevis 24 connecting between the two sections of the conductor 23, and thus allowing current to flow through the circuit provided by the cord 14, consequently illuminating the lamp 11.

Figure 3:
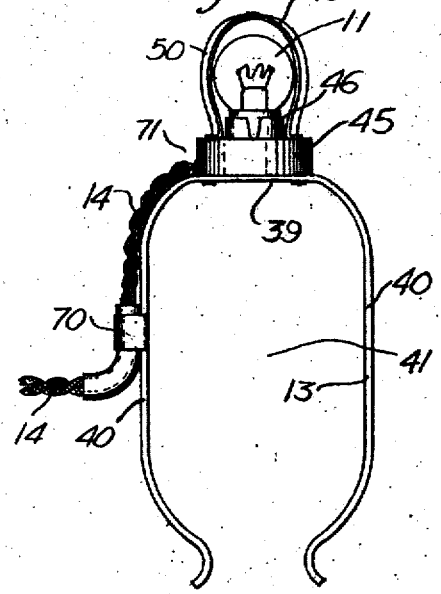
Fig. 3 is an enlarged elevation of a signal adapted to be clamped upon the arm as illustrated in Fig. 1.
Figure 4:
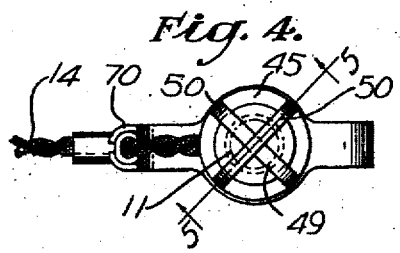
Fig. 4 is a plan view of the signal shown in Fig. 3.

A preferred form of construction of my signal is shown in Fig. 3, in which the clamp 13 is comprised of a base plate 39 having two forks 40 extending therefrom, these forks 40 being substantially parallel in extension so that an elongated enclosure 41 is formed therebetween through which the ulna and radius bones of the forearm near the wrist pass when the signal is applied to the arm as shown in Fig. 1. The particular shape of the clamp 13 makes it impossible to misplace the signal upon the arm with the lamp 11 in a position other than in a plane extending substantially through the driver's extended or open hand, which position of the hand is naturally assumed when a traffic signal is being given. This maintenance of the lamp 11 upon the top of the driver's arm constitutes one of the particular features of my invention, as with the light in this position it is possible for it to be seen from the front, rear and also from the sides, which would not be possible with the light located upon the back of the arm.

The lamp 11 is maintained upon the base plate 39 of the clamp 13 by a socket member 45 which consists, as shown in Fig. 5, of an inverted cup stamping having outwardly formed jaws 46 in which the plug 47 of the lamp 11 is received and maintained. A guard member 49 is comprised of a pair of crossed flat bands 50 bent into the shape shown, the ends 51 of the guard bands 50 being adapted to pass through holes 52 in the socket member 45 and holes 53 in the base 39 so as to provide a means for holding the socket member 45 securely upon the clamp 13. Offsets 54 formed in each of the bands 50 engage the top of the socket member 45 and prevent its being removed from the base 39 of the clamp when outwardly bent toes 55, formed upon the extreme lower ends of the bands, engage the under side of the base plate 39 as shown in Fig. 5. The guard and the socket may easily be removed for the purpose of renewing the lamp 11 or making connections by pressing the ends 51 of the bands 50 inwardly so that the toes 55 will pass through the holes 53.

A fiber disc 60, having notches 61 formed therein through which the ends 51 of the bands 50 may pass, is maintained within the socket member 45 and supports thereupon a pair of contact plates 65 to which the ends 66 of the conductors 23 and 33 comprising the cord 14 are attached, these contact members being adapted to bear against contact lugs 69 which are provided upon the underside of the plug 47 of the lamp 11 so that connection of the lamp into the electric circuit may be made simply by inserting the plug 47 in the socket.

The essential features of my invention consist in the supporting of a signal lamp upon the forearm in such a position that the light may be observed from the front, rear, and sides; to energize this lamp from the electric system of the automobile; and to provide a means whereby the energization of the light will occur only when the arm is extended so as to place a tension upon the connecting cord.

A further feature in the construction of my device resides in the attachment of the cord centrally to one of the forks 40 of the clamp 13, as shown at 70 in Fig. 3, thus preventing the displacement of the lamp due to the eccentric pull of the cord upon the clamp when the arm is extended, which would occur were the cord attached directly to the point 71 at which it makes contact with the spring plates 65.

I claim as my invention:

1. In a signal for use on automobiles, the combination of: a clamp adapted to be applied upon the forearm, the forks of said clamp being substantially parallel so as to prevent the turning of said clamp upon said arm; an electric lamp mounted upon said clamp in a plane parallel to said forks; and a pair of electric conductors connected between a battery mounted in said automobile and said lamp, providing a circuit whereby said lamp may be illuminated.

2. In a signal for use on automobiles, the combination of: a clamp adapted to be applied upon the forearm, the forks of said clamp being substantially parallel so as to prevent the turning of said clamp upon said arm; an electric lamp mounted upon said clamp in a plane parallel to said forks; a pair of electric conductors connected between a battery mounted in said automobile and said lamp, providing a circuit whereby said lamp may be illuminated, one of said cords being shorter than the other; a tension actuated switch inserted in said shorter cord for closing said circuit when a tension is placed upon said cords; and means for attaching said cords to said clamp at an intermediate point so that the pull of said cords upon said clamp will not exert a rotative force upon said clamp.

In testimony whereof, I have hereunto set my hand at Los Angeles, California this 17th day of May, 1922.

HERBERT S. HEINEMAN.